United States Patent [19]

Roman

[11] 4,109,956
[45] Aug. 29, 1978

[54] FORKLIFT EXHAUST DEFLECTION SHIELD AND METHODS OF CONSTRUCTING AND UTILIZING SAME

[75] Inventor: Ronald S. Roman, Novi, Mich.

[73] Assignee: Faygo Beverages, Inc., Detroit, Mich.

[21] Appl. No.: 692,922

[22] Filed: Jun. 4, 1976

[51] Int. Cl.² ............................................. B60J 9/00
[52] U.S. Cl. ............................. 296/78 R; 135/5 A; 214/DIG. 7; 296/102
[58] Field of Search ............... 180/11, 54 A, 89.13, 180/89.14, 89.15, 89.16, 89.17, 89.18; 296/78 R, 85, 95 R, 28 C, 102; 214/450, DIG. 7; 135/5 A; 24/16 PB

[56] References Cited

U.S. PATENT DOCUMENTS

| | | | |
|---|---|---|---|
| 2,263,978 | 11/1941 | Branovic | 214/DIG. 7 |
| 2,423,748 | 7/1947 | Acheson | 296/28 C |
| 2,805,887 | 9/1957 | Selby | 214/DIG. 7 |
| 3,336,074 | 8/1967 | Barnes | 214/DIG. 7 |
| 3,457,598 | 7/1969 | Mariani | 24/16 PB |
| 3,599,740 | 8/1971 | Martinmaas | 296/28 C |
| 3,709,553 | 1/1973 | Churchill | 296/78 R |
| 3,958,826 | 5/1976 | Upton | 296/78 R |

Primary Examiner—Joseph F. Peters, Jr.
Assistant Examiner—John A. Carroll
Attorney, Agent, or Firm—Irving M. Weiner

[57] ABSTRACT

A method and device for deflecting exhaust gases away from the driver area of a forklift truck. A sheet of shatterproof, transparent material is attached to the guard rails located at the rear of the driver area. The sheet, acting as a deflector shield, covers the entire rear of the driver area and is inwardly curved at the top to further aid in deflecting the gases. It is easily removed and replaced. The shield is particularly effective when the forklift truck is backed-up.

6 Claims, 3 Drawing Figures

U.S. Patent  Aug. 29, 1978  4,109,956
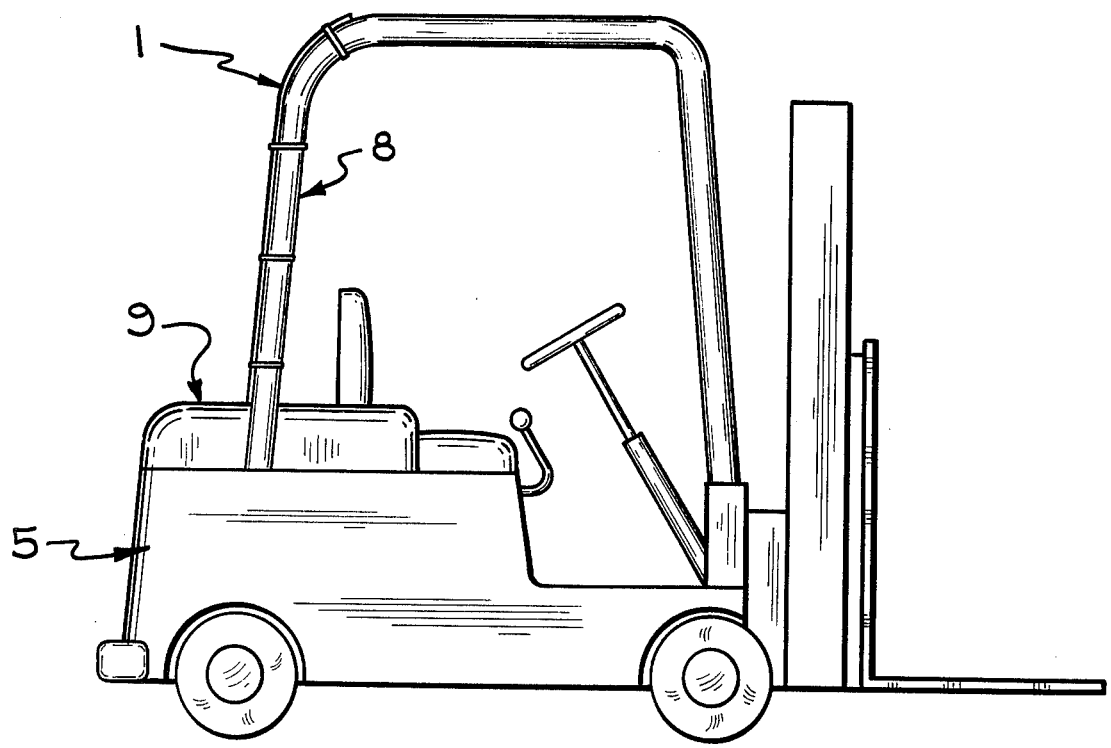
FIG. 1
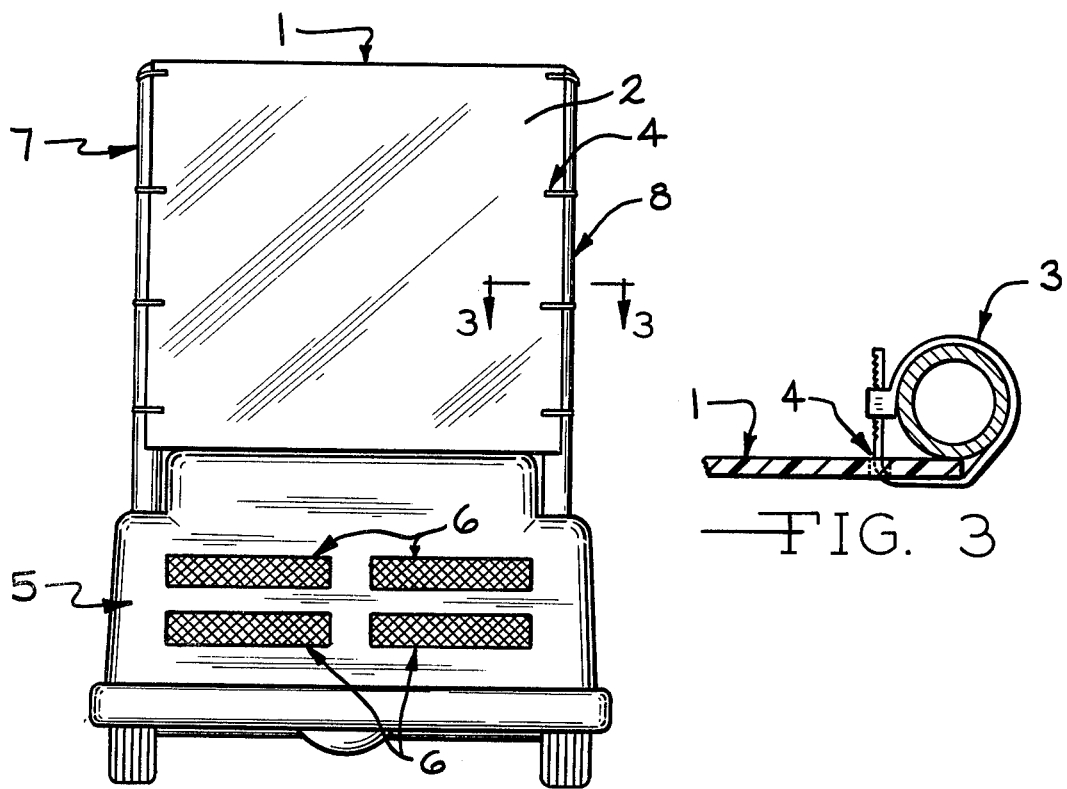
FIG. 2
FIG. 3

FORKLIFT EXHAUST DEFLECTION SHIELD AND METHODS OF CONSTRUCTING AND UTILIZING SAME

The present invention is directed to protection apparatus, for various vehicles of the land, sea and air variety, and in particular, to a transparent shield to deflect the exhaust fumes away from the driver area of a forklift truck.

BACKGROUND OF THE INVENTION

Forklift trucks are used both inside and outside of business buildings for the express purpose of moving products and equipment, either incoming or outgoing or from point to point in the plant as desired. This is accomplished by means of a forklift in the front of the vehicle, which is normally hydraulically controlled, that is placed under the item or items to be moved, and lifted to any desired height and then taken to the desired location. The driver area is completely open except for a pair of guardrails that offer some protection to the driver in case of a roll-over or from protruding objects.

Because the driver area is completely open, it is exposed totally to its own exhaust gases. This is especially true when the vehicle is backed-up for any reason. The breathing in of these exhaust gases by the driver is extremely hazardous to his health, and toxic enough to dull his driving capabilities to the point where an accident is very likely.

It is to avoid these conditions that the present invention has been directed.

The prior art is exemplified by the following patents which do disclose some means for protecting the driver from atmospheric and climatic conditions: U.S. Pat. No. 1,919,387, issued to T. F. Stringer; U.S. Pat. No. 2,583,918, issued to William C. Wilson; U.S. Pat. No. 2,532,948, issued to Howard Sanden, et al; U.S. Pat. No. 2,667,379, issued to G. P. Baze; and U.S. Pat. No. 3,841,430, issued to John H. Babbitt et al.

These prior art patents while attempting to solve certain problems to which they are directed, fail to solve the above-discussed problems. U.S. Pat. No. 2,667,379, for example, provides a completely-transparent cab, and access is similar to that of an airplane cockpit. The purpose of the cab is to protect the operator of the tractor from the weather. While the cab is transparent and shatterproof, these characteristics are the only similarities with that of the present invention.

SUMMARY AND OBJECTS OF THE INVENTION

The present invention provides a protection apparatus for vehicles, such as trucks, boats, airplanes, helicopters, etc. The apparatus includes a substantially transparent shield which is removably connected to such a vehicle. The vehicle includes a portion for bearing occupants, such as a driver and/or passenger area, and a rearward portion from which exhaust fumes emanate. The substantially transparent shield is removably connected to the vehicle and is interposed between such occupant-bearing portion and such exhaust-emanating portion of the vehicle.

It is a primary object of the present invention to provide a protection apparatus in relation to a forklift truck, sometimes referred to as a Hi-Lo, in protecting the driver of such a truck against over-inhalation of the truck's exhaust gases, especially when backing-up.

Another object of the present invention is to provide a protection apparatus for the driver against over-inhalation of exhaust gases that is transparent and shatterproof.

A further object of the present invention is to provide a protection apparatus for the driver against over-inhalation of exhaust gases that does not interfere with or prevent the operation or maintenance of the vehicle. The protective shield is easily installed and removed.

BRIEF DESCRIPTION OF THE DRAWINGS

The above and other object and advantages of the present invention will become apparent from the following description when read in conjunction with the accompanying drawing, wherein:

FIG. 1 is a side elevational view of a preferred embodiment of the present invention shown in position on a forklift truck.

FIG. 2 is a rear view of the truck showing the present invention in position.

FIG. 3 is a sectional view taken generally along lines 3—3 shown in FIG. 2.

DETAILED DESCRIPTION OF PREFERRED EMBODIMENT

Referring now to the drawing, there is illustrated the shield, generally designated by the numeral 1, shown in position upon a vehicle, such as a forklift truck designated by the numeral 5.

The shield 1 comprises a continuous sheet 2 which extends across the vehicle 5 from approximately the rear mid-point of the guard rail 7 of the vehicle 5 to approximately the rear mid-point of the guard rail 8. In the vertical direction, sheet 2 sits-on top of the cover 9 of the engine compartment of the vehicle 5 and follows the contour of the guard rails 7 and 8 up around the curved upper rear portion for approximately 60° to further deflect the exhaust gases away from the interior of the driving area.

Sheet 2 contains a plurality of holes 4 along its right and left sides located such that they are a short distance within the guard rails 7 and 8, respectively. The holes 4 are sufficiently large in diameter to accept the mounting brackets or components 3 which may be made of a plastic strapping material. One type of such commercial strapping material is known under the trademark "Ty-Rap" listed in "The Trademark Register of the United States" under Class 7.

Sheet 2 may be fabricated or made from a transparent shatterproof plastic or glass, such as Plexiglas or Lexan, of any thickness desired; however, thicknesses ranging from 0.080 inch to ¼ inch appear to be the most advantageous as far as weight and flexibility is concerned.

In operating the vehicle 5, the exhaust gases are emitted through the gratings 6 and tend to rise vertically. Without the shield 1, especially when the vehicle 5 is backed up or moved in reverse, the exhaust gases have constant free access to the driver area with the consequential discomfort of and danger to the driver leading to serious illness and possible vehicle accidents. With the shield in place, the exhaust fumes are deflected around and above the driver area avoiding the dire consequences.

The sheet is transparent to avoid any impediment of the driver's vision, and is shatterproof to avoid any injury to the driver through possible breakage.

For maintenance purposes, the shield 1 is easily removed by disconnecting the mounting brackets or components 3, or, since they are relatively inexpensive, cutting the brackets 3 and replacing them when reassembling.

While the present invention has been described and disclosed with respect to a single embodiment, it is to be understood that numerous changes and modifications may be made therein without departing from the spirit and scope of the present invention as defined in the appended claims. For example, the present invention may be used in connection with marine vehicles, snow and ice vehicles, etc.

I claim:

1. A protection apparatus for a vehicle, comprising, in combination:

a transparent continuous sheet shield which is removably connected to said vehicle;

said vehicle comprising a substantially open forklift truck with inverted U-shaped guard rails disposed thereon and having rearward legs and including a portion for bearing occupants and a rearward portion from which exhaust fumes emanate;

said shield having a width dimension substantially equal to the width dimension of said forklift truck and a height dimension substantially equal to the height dimension of said occupant-bearing portion of said forklift truck;

said transparent shield being removably connected to said forklift truck and being substantially disposed in a vertical plane rearwardly of said occupant-bearing portion and forwardly of said rearward exhaust-emanating portion so as to deflect exhaust gases away from said occupant-bearing portion of said forklift truck;

said shield having its lowermost edge disposed adjacent the engine compartment cover of said forklift truck;

said shield having its uppermost edge disposed adjacent the uppermost rearward portions of said guard rails; and means for mounting the shield on the guard rails of said forklift truck.

2. A protection apparatus according to claim 1, characterized in that said shield is curved inwardly at the top thereof to follow the upper contour of the uppermost rearward portions of said guard rails so as to further deflect said exhaust gases away from said occupant-bearing portion of said forklift truck, and said top curved portion of said shield follows the upper contour of said inverted U-shaped guard rails for approximately 60°.

3. A protection apparatus according to claim 1, characterized in that said shield is fabricated of substantially shatterproof and flexible Plexiglas.

4. A protection apparatus according to claim 1, wherein:

said continuous sheet shield is shatterproof;

said guard rails of said forklift truck comprise a pair of inverted U-shaped tubular members mounted adjacent the side portions of said forklift truck and extending upwardly around the occupant-bearing portion of said truck; and said shield has a side edge thereof mounted on each rearward leg of said pair of guard rails and said shield extends between said rearward legs of said guard rails.

5. A protection apparatus according to claim 4, wherein said mounting means comprises a plurality of adjustable mounting components passing through a plurality of holes provided along each side of said sheet and tightened around said guard rails of said forklift truck.

6. A protection apparatus according to claim 5, wherein said mounting components include plastic strapping material adapted to be tightened around each of said guard rails.

* * * * *